Oct. 11, 1960  B. E. JONES, JR., ET AL  2,955,805
ICE CUTTING DEVICE
Filed Jan. 9, 1959
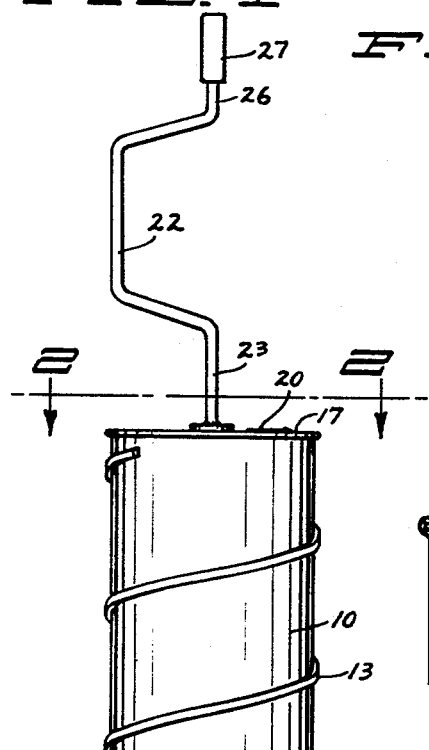
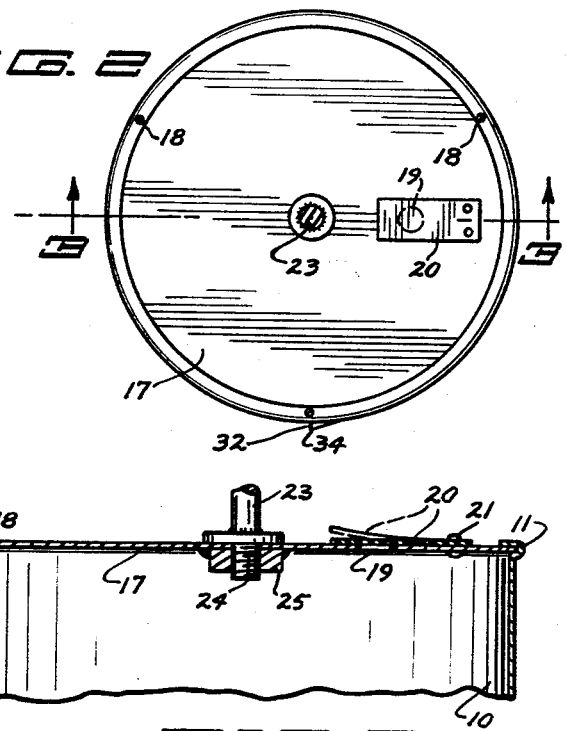
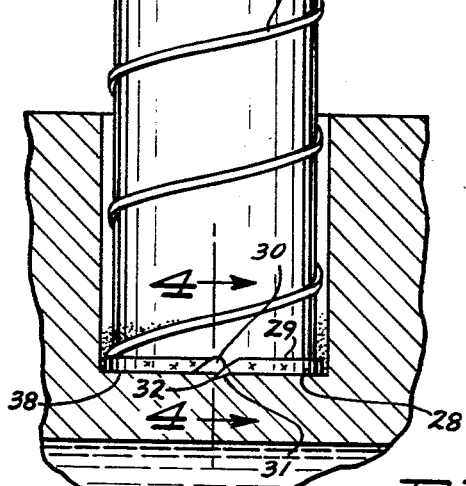
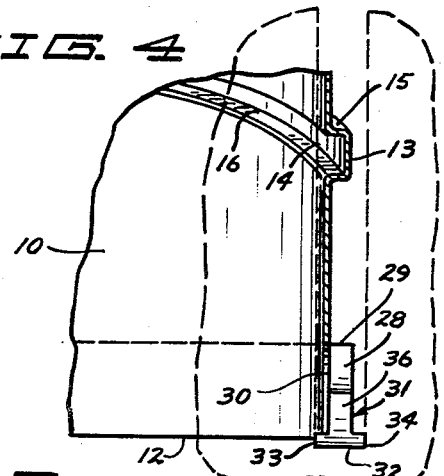
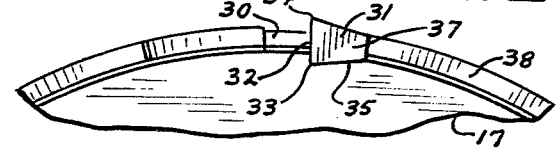
INVENTORS
BEAUFORD E. JONES JR.
BY ALFRED H. HUEHN
Braddock and Braddock
ATTORNEYS

United States Patent Office 2,955,805
Patented Oct. 11, 1960

2,955,805

ICE CUTTING DEVICE

Beauford E. Jones, Jr., 4108 Halifax Ave. N., Robbinsdale 22, Minn., and Alfred H. Huehn, 2544 32nd Ave. S., Minneapolis, Minn.; said Huehn assignor to Laird C. McKee, Minneapolis, Minn.

Filed Jan. 9, 1959, Ser. No. 785,809

2 Claims. (Cl. 255—69)

This application is a continuation-in-part of our application Serial No. 625,954, for Ice Cutting Device, filed December 3, 1956.

The invention herein has relation to a device for cutting holes in solid material designed to be especially useful for providing fishing holes through ice on lakes, streams, etc.

In the accompanying drawing forming a part of this specification,

Fig. 1 is a side elevational view of an ice cutting device made according to the invention as when applied to use;

Fig. 2 is an enlarged sectional view, taken on line 2—2 in Fig. 1;

Fig. 3 is an enlarged sectional view, taken on line 3—3 in Fig. 2;

Fig. 4 is an enlarged sectional view, taken on line 4—4 in Fig. 1; and

Fig. 5 is an enlarged fragmentary bottom plan view of the device.

An elongated hollow cylinder 10 of the device, desirably constructed of steel, is of diameter less than that of a hole to be cut, as through ice, by the device. The upper and lower ends, denoted 11 and 12, respectively, of said hollow cylinder are in perpendicular relation to the longitudinal axis thereof. A helix 13, of rectangular cross section, integral with and disposed exteriorly of the hollow cylinder, extends from an upper portion to near the lower end 12 of said hollow cylinder. The helix 13 is produced by shaping metal of the hollow cylinder outwardly which results in the provision of a spiral groove 14 interiorly of said hollow cylinder in transverse alinement with said helix. An upwardly facing surface of the helix, situated exteriorly of the hollow cylinder, is denoted 15, and an upwardly facing surface bounding the spiral groove 14, situated interiorly of said hollow cylinder, is indicated 16. The upwardly facing surfaces 15 and 16, respectively, are continuous and slant upwardly gradually and evenly circumferentially of the hollow cylinder.

The lower end of the hollow cylinder 10 is open and the upper end thereof is closed, in fluid-tight manner, by a circular plate 17 made rigid, as at 18, with said hollow cylinder. An aperture 19 through the circular plate 17 is normally closed by a flexible strip 20 engaged against an upper surface of and having an end portion thereof secured, as at 21, to said circular plate.

Means for accomplishing rotation of the hollow cylinder 10 is constituted as a crank shaft 22 including a lower end portion 23 rigidly secured, as at 24, in a protuberance 25 disposed centrally of the circular plate 17 and welded to the internal surface thereof. An upper end portion 26 of the crank shaft 22, longitudinally alined with the lower end portion 23 thereof, supports a hand grip 27.

A band 28, preferably of steel, is welded to the external surface of the lower end portion of the hollow cylinder 10. An upper surface 29 of said band is contiguous with the lower ends of the helix 13 and the spiral groove 14, as well as with the lower end of the upwardly facing surface 15 provided by said helix and the lower end of the upwardly facing surface 16 bounding said spiral groove.

A lower end portion of the hollow cylinder 10 and the full width of the band 28 are cut away, as at 30, both at the front of and above a forwardly facing cutter blade 31 situated at an advance end of and provided by said band. The cut-away portion 30 provides clearance for passage of chipped or scraped ice from the cutter blade either exteriorly to the upwardly facing surface 15 of the helix 13 or interiorly to the upwardly facing surface 16 bounding the spiral groove 14, as the case may be. A straight knife edge 32 of said cutter blade, at the forward end thereof, is below the lower end 12 of the hollow cylinder 10 and in perpendicular relation thereto, as well as in a plane passed longitudinally and diametrically through said hollow cylinder. Stated otherwise, the knife edge 32 extends radially of the hollow cylinder adjacent to the lower end thereof. It is longitudinally alined with the wall of said hollow cylinder, as well as with a forward part of the band 28. An interior end 33 of said knife edge terminates at a location somewhat interiorly of the internal surface of the wall of the hollow cylinder and an exterior end 34 of the knife edge terminates at a location somewhat exteriorly of the external bounding surface of the helix 13. In other words, an interior end of the knife edge 32 terminates interiorly of the wall of the hollow cylinder at a location in spaced relation to the circumference of the internal surface thereof and the exterior end of said knife edge terminates exteriorly of the helix at a location in spaced relation to the circumference of the external bounding surface thereof. The opposite side surfaces 35 of the cutter blade 31 converge smoothly from the opposite ends 33, 34, respectively, of the straight knife edge 32 rearwardly to the opposite side surfaces of the band 28, an upper surface 36 of said cutter blade slants smoothly upwardly and rearwardly from the straight knife edge to the upper surface 29 of said band, and the lower surface 37 of the cutter blade slants smoothly upwardly and rearwardly from the straight knife edge to a lower surface 38 of said band. The cutter blade slants downwardly and forwardly from the advance end of the band 28.

The ice cutting device is disclosed in Fig. 1 of the drawing as it would appear when being employed to cut a cylindrical fishing hole through ice. The crank shaft 22 is to be employed to rotate the device while the lower end of the hollow cylinder 10 and the lower surface of the band 28 are rested upon the ice to support the device in vertical position. The cutter blade will chip or scrape ice from the mass thus to provide an annular groove in which the hollow cylinder of the device will move downwardly by gravity. The upper surface 36 of the cutter blade will direct the chips of scraped ice, directly or by way of the cut-away portion 30, to either one of the other of the upwardly facing surfaces 15 or 16, as the case may be, whence the chips or scraped ice will become removed from the annular groove in response to continued rotation of the hollow cylinder. There will be a cylindrical block of ice severed from the mass upon completion of the cutting operation of diameter somewhat less than that of the hollow cylinder. And there will be an annular space upon completion of the cutting operation bounded at its interior by the external cylindrical surface of the severed block of ice, of diameter smaller than that of said hollow cylinder, and bounded at its exterior by an internal cylindrical surface of the mass of ice of diameter greater than that of the helix 13. The severed cylindrical block of ice will be readily and easily removable, either from the hollow cylinder or from floating position in the fishing hole. The flexible strip 20 will be permitted to remain in closed position, as in full lines in Figs. 1 and 3 of the drawing, when it is desired that a severed cylndrical block be removed from a fishing hole together with the hollow cylinder of the device as it is removed. Said flexible strip will be moved to open position, as in dotted lines in said Fig. 3, when a severed cylindrical block is to be left floating upon removal of said hollow cylinder.

What is claimed is:

1. An ice cutting device to be supported in vertical position on a surface of ice to be cut, comprising an elongated hollow cylinder including a helix integral with, disposed exteriorly of and extending from an upper portion to a lower end of said hollow cylinder and providing and bounding a spiral groove contiguous with the interior of the hollow cylinder and disposed interiorly of the helix in transverse alinement therewith, said helix also providing an upwardly facing surface situated exteriorly of the hollow cylinder and said spiral groove being bounded at a lower portion thereof by an upwardly facing surface disposed interiorly of and provided by said helix, the upwardly facing surfaces situated exteriorly of said hollow cylinder and interiorly of the helix, respectively, being continuous and slanting upwardly and evenly circumferentially of the hollow cylinder, a circumferentially extending band on a lower end portion of said hollow cylinder, a forwardly facing, downwardly slanting cutter blade on a forward end of said band below the elevation of and longitudinally alined with a wall of the hollow cylinder and the band, said cutter blade including a knife edge at the front end thereof an interior end of which terminates interiorly of an internal surface of the wall of said hollow cylinder and an exterior end of which terminates exteriorly of said helix, a portion of said band in advance of said cutter blade being cut away and a lower end of the hollow cylinder having an opening therethrough at a location in front of, above and contiguous with said spiral groove and said cutter blade, and means to be actuated to cause said hollow cylinder to be rotated.

2. The combination as specified in claim 1, a circular plate rigid with an upper end portion of said hollow cylinder and having an aperture therethrough, and valve means normally retaining said aperture in closed condition, said circular plate and valve means when situated to retain said aperture in closed condition together sealing the upper end of said hollow cylinder closed in fluid-tight manner and the valve means being manually actuable to position where in uncovering relation to said aperture.

References Cited in the file of this patent

UNITED STATES PATENTS

| | | |
|---|---|---|
| 261,841 | Fleming | Aug. 1, 1882 |
| 286,599 | Fitzgerald | Oct. 16, 1883 |
| 1,484,352 | Izard | Feb. 19, 1924 |
| 2,008,523 | Thomas | July 16, 1935 |
| 2,666,623 | Johnson | Jan. 19, 1954 |